2,848,311
MANUFACTURE OF SILICEOUS PELLETS

Charles A. Greene, Pittsburgh, Pa., assignor, by decree of distribution, to Edith E. Greene No Drawing. Application April 22, 1954
Serial No. 425,043

2 Claims. (Cl. 23—313)

This invention relates to a process of beading or pelletizing synthetic siliceous pigments.

Synthetically produced siliceous pigments, such as those sold under the trademarks "Hi-Sil," "Silene," "Hi-Sil C" and "Silene EF," are used in reinforcing and coloring certain rubber and plastic compounds. These pigments are available commercially in fine powder form. The handling of pigments in fine powder form, however, has always been a nuisance and an inconvenience because of the problems created by dust and the need for providing dust elimination equipment. Furthermore, the handling of siliceous pigments in fine powder form presents a very definite hazard to health.

In contrast, there are many very definite advantages in handling these pigments in bead or pellet form, in addition to the elimination of the dust problem. Pigments in pellet form are more compact and of greater density by volume than pigments of fine particle size or powder form, so that actually from 50% to 75% greater weight can be filled per bag or package with more efficient utilization of shipping and storage space. In addition, pellets or beads can be poured by gravity, thereby greatly facilitating the handling thereof in point of convenience, rapidity and economy. For example, bag or package-filling machinery, low in cost, operation and upkeep, can be employed; beads and pellets can be shipped in bulk form in open freight cars, something that would be out of the question with pigment in powder form; and pellets may be economically and quickly delivered from one part of a plant to another through pipes and chutes.

Although certain amorphous pigments, such as carbon black, have been pelletized successfully and used commercially in pellet form to very great advantage in compounding and coloring of rubber and plastics, attempts to pelletize dry synthetic siliceous pigments by the methods employed in pelletizing dry carbon black have proven unsatisfactory for commercial use. For example, although it was found possible to form round, soft beads of dry synthetic siliceous pigments by conventional dry process methods ordinarily employed in pelletizing carbon black, there was no tendency of the particles of the pigment in the Hi-Sil pellets to dense, with the result that the beads were so weak in texture that they would crumble away to powder again very readily; and, of course, pellets so formed offered no advantage in packing or shipping.

It is not surprising that methods of pelletizing powdered carbon black are not applicable to siliceous pigments, since fine particle size carbon black, whether channel or furnace type, is formed through the incomplete combustion of gas or oil at very high temperatures, and is, therefore, practically free of all moisture when formed, whereas fine particle size siliceous pigments are developed through the use of water in very great excess. Even after filtering, Hi-Sil carries more than five times its own weight of water, and, as a matter of fact, Hi-Sil filter cake pulp carries some 85% water by weight to make a fairly stiff paste. It would appear then that the high moisture content of synthetic siliceous pigments as formed would make the application of the conventional dry pelletizing process of carbon black impractical because of the great expense of driving off excess water. Furthermore, synthetic siliceous pigments in fine particle size are of much lower density than carbon black in fine particle size and evidence less tendency to compress in dry pelletizing processes.

The present invention is based on the theory that synthetic siliceous pigments in small particle form can be densed and formed into pellets more readily while in the form of a semi-wet pulp. Accordingly, while the pulp is being subjected to tumbling action to form the pellets, the moisture content is gradually reduced and carefully regulated, so that ultimately at the completion of the tumbling action, the moisture content of the pulp is reduced to about 5% by weight. In the development of the process of the present invention, it has been found that the utilization of high temperatures to rapidly reduce the moisture content of the pulp has a tendency to bake out in hard pellets which will not disperse properly in the compound to be colored. On the other hand, if the pulp is heated to moderate temperatures and the evaporation of the moisture therefrom encouraged by the passage of warm dry air in proximity to the pulp during the tumbling action, pellets having the desired strength and density characteristics may be much more readily formed. The present invention accordingly takes advantage of the original wet condition of the siliceous pigments in the form of filter cake pulp just as it leaves the filter press. Thus, according to the present invention, it is possible to form the siliceous pigment into pellets and at the same time to dehydrate it.

My improved process for pelletizing Hi-Sil and other synthetic siliceous reinforcing pigments is outlined below:

Step A

The pigment in filter cake pulp state is carried on endless conveyors from the filter press and deposited in a heated, horizontal rotary mixer. The pigment should not be heated to a temperature above 95° C. Here the pulp is tumbled and broken into rough clusters under a current of dry warm air which enters the mixer at the discharge end, passing through the mixer counterwise to the movement of the pulp, and removed through an exhaust end of the mixer in the vicinity of the inlet end. During this initial tumbling operation, some 30 to 35% of the moisture should be removed, so that the moisture content of the mass as it leaves the mixture is reduced to about 55% to 60% by weight.

Step B

The pulp in broken or crumbled form is then introduced by an inclined helicoidal conveyor or other suitable apparatus, into a well-heated horizontally rotatable tumbler drier cylinder through an inlet opening at one end. As in Step A, the pigment should not be heated to a temperature above 95° C. The pulp is herein further tumbled to form large beads or pellets as the moisture content is gradually reduced even further. Depending upon the size of this cylinder, it will revolve at a speed of approximately 8 to 15 R. P. M. Dry warm air is blown into the cylinder from the discharge end counterwise to the movement of the tumbling mass, and at the same time the saturated air is removed in smaller volume from the other end of the tumbler drier cylinder through an exhaust duct. As the tumbling mass is discharged at the discharge end of the tumbler drier cylinder, it will be in the form of large beads or pellets. As a result of the additional water lost during its passage through the tumbler drier, the moisture content of the beads or pellets should be reduced to approximately 50% of the total mass.

Step C

The coarse or large-size beads or pellets are then screened to remove any accidental lumps or oversized balls which are returned to the mixer of Step A for reprocessing.

Step D

After screening, the large beads or pellets are introduced into a second horizontal well-heated tumbler drier cylinder identical to the one used above in Step B. The operation is continued in this second tumbler drier as in the previous tumbler drier; that is to say, during the tumbling action dry air is blown into the discharge end counterwise to the movement of the pellets and the saturated air is removed through exhaust ducts at the opposite or feeding end of the cylinder. The operation is continued in this second tumbler drier until the pellets have been reduced to the size desired, the moisture content being controlled so that at the completion of the pellet-forming operation the moisture content will have been reduced to about or less than 5% of the total mass.

Step E

The pellets in this form may then be fed through suitable screens to remove oversized and undersized pellets which may be sent back to the mixer of Step A for reprocessing. The beads, carrying not more than 5% moisture, may then be fed on conveyors to storage bins or to packaging or shipping stations.

Thus, by regulating the volume of dry air introduced into the tumbler, the heating of the cylinder, and the rotation of the cylinder, the formation of the pellets may be controlled so that uniformly dense and firm pellets of desired size and moisture content may be produced in a continuous process.

The invention has been disclosed in but a single preferred form and by way of example only, and obviously many modifications and variations may be made in the manner of carrying out the invention which are still within the spirit thereof. The invention, therefore, is not to be limited to any particular form or embodiment, except insofar as such limitations are set forth in the appended claims.

I claim:

1. A process of forming synthetic siliceous pigments into round, firm pellets comprising the steps of subjecting the said pigment in the filter cake pulp state, in which state the moisture content of the filter cake pulp is in the order of 85% by weight, to a crumbling action to break the pulp into rough clusters and at the same time drying the mass during said crumbling action to reduce the moisture content of the mass to about 55% to 60% by weight by heating the mass to a temperature not to exceed 95° C., then subjecting the mass to a tumbling action in a rotating drum to form the pellets and at the same time subjecting the mass during the tumbling action to warm dry air to still further reduce the moisture content of the mass by heating the mass to a temperature not to exceed 95° C., screening the mass to isolate the properly formed pellets, subjecting the properly formed pellets to another tumbling action and at the same time reducing the moisture content of the pellets, the rate of tumbling and the rate of reducing the moisture content being controlled so that at the completion thereof, round, firm pellets of desired size will be formed having a moisture content of about 5% by weight.

2. A process as set forth in claim 1 wherein the moisture content of the mass is reduced during the pellet forming tumbling action to about 50% by weight.

References Cited in the file of this patent

UNITED STATES PATENTS

| | | |
|---|---|---|
| 1,466,571 | Thorssell et al. | Aug. 28, 1923 |
| 1,947,971 | Cox | Feb. 20, 1934 |
| 2,297,300 | Hardesty | Sept. 29, 1942 |
| 2,518,221 | Wiegand et al. | Aug. 8, 1950 |
| 2,695,221 | Klugh et al. | Nov. 23, 1954 |

FOREIGN PATENTS

| | | |
|---|---|---|
| 677,077 | Great Britain | Aug. 6, 1952 |

OTHER REFERENCES

"Agglomeration," report in "Chemical Engineering," October 1951, vol. 58, No. 10, pages 161 to 174 inclusive.

UNITED STATES PATENT OFFICE
CERTIFICATE OF CORRECTION

Patent No. 2,848,311                      August 19, 1958

Charles A. Greene

It is hereby certified that error appears in the printed specification of the above numbered patent requiring correction and that the said Letters Patent should read as corrected below.

Column 4, line 34, list of references cited, under the heading, "UNITED STATES PATENTS" for the patent number "2,518,221" read -- 2,518,211 --.

Signed and sealed this 28th day of October 1958.

(SEAL)
Attest:

KARL H. AXLINE
Attesting Officer

ROBERT C. WATSON
Commissioner of Patents